United States Patent [19]
Kelly

[11] Patent Number: 5,980,750
[45] Date of Patent: Nov. 9, 1999

[54] PROCESS FOR THE PURIFICATION OF WASTE WASH WATER

[75] Inventor: Michael D. Kelly, Memphis, Tenn.

[73] Assignee: Mobile Process Technology, Co., Memphis, Tenn.

[21] Appl. No.: 09/111,103

[22] Filed: Jul. 6, 1998

[51] Int. Cl.[6] ...................................................... C02F 9/00
[52] U.S. Cl. ........................ 210/638; 210/669; 210/670; 210/688
[58] Field of Search ..................... 210/638, 652, 210/663, 669, 670, 688, 900

[56] References Cited

U.S. PATENT DOCUMENTS

| | | | |
|---|---|---|---|
| 3,870,033 | 3/1975 | Faylor et al. | 210/900 |
| 4,540,493 | 9/1985 | Dickerson et al. | 210/669 |
| 5,017,291 | 5/1991 | Semler et al. | 210/652 |
| 5,061,374 | 10/1991 | Lewis | 210/900 |
| 5,470,481 | 11/1995 | Modell et al. | 210/652 |

*Primary Examiner*—Ivars Cintins
*Attorney, Agent, or Firm*—Ray F. Cox, Jr.

[57] ABSTRACT

An improved apparatus and method for the purification of waste wash water derived from the production of aromatic acids. Lost aromatic acid product and the heavy metal oxidation catalyst is recovered and purified water is recycled to the process. The process includes the steps of filtration to recover the insoluble aromatic acid, ion exchange to recover and purify the heavy metal oxidation catalyst, and a reverse osmosis system for recovering the water for reuse.

8 Claims, 3 Drawing Sheets

PROCESS FOR THE PURIFICATION OF WASTE WASH WATER

BACKGROUND OF THE INVENTION

The field of the invention relates to processes for the production of aromatic acids, and in particular, to an improved aromatic acid manufacturing process that recovers lost product, heavy metal oxidation catalyst and process water used in the manufacture of certain aromatic acids. The aromatic acids include, but are not limited to, terephthalic (TA) and isophthalic acids (IPA).

Very large amounts of aromatic acids are produced worldwide each year. The major aromatic acids produced are TA and IPA that are raw materials for textile fibers and food packaging resins and films. The typical aromatic acid is produced from the oxidation, in the presence of a heavy metal oxidation catalyst, of alkyl aromatics such as paraxylene and metaxylene to the corresponding aromatic acid. The oxidation process produces a technical grade product typically not suitable for certain applications because of impurities produced during the oxidation process. The impurities are usually partially oxidized intermediates (paratoluic acid, 4-carboxybenzaldehyde, etc.) and color formers such as 2,6-dicarboxyfluorenone. The impurities create deleterious effects on polymer products produced from the technical grade aromatic acid.

Technical grade TA and IPA are further purified to remove the impurities by dissolving the aromatic acid in very hot demineralized water at elevated temperature and pressure. The aqueous solution and hydrogen is then passed through a vessel containing a hydrogenation catalyst that purifies the aromatic acid product further. The aqueous solution is then cooled causing the aromatic acid to crystallize out of solution. The aromatic acid is then recovered by conventional means such as centrifugation or rotary vacuum filtration. The hydrogenated impurities remained dissolved in the wastewater. The wastewater generated from the process contains the unwanted impurities as well as residual amounts of the aromatic acid and the heavy metal oxidation catalyst. Typically the wastewater is sent to a wastewater treatment process resulting in the loss of the aromatic acid product, heavy metal oxidation catalyst and water.

Dickerson et al. (U.S. Pat. No. 4,540,493) disclose a process for treating wash water from the manufacturing of terephthalic acid. The process includes the steps of passing the wash water through a filter medium to remove undissolved terephthalic acid solids, passing the filtered water through a cation exchange resin in hydrogen form to remove the metal catalysts, and passing the water through an anion exchange resin to remove dissolved terephthalic acid and dissolved organic acid byproducts. However, this process has the disadvantage that the use of cation IER in the hydrogen form can result in the fouling of the resin since the hydrogen ion could react with the soluble aromatic acids and cause them to precipitate and foul the resin. The anion resin also consumes considerable amounts of sodium hydroxide to remove the aromatic acids. Also this process does not directly recover for reuse the cobalt/manganese catalyst. It is desirable to recover all components of the wash water for recycling.

Accordingly, there exists a need for the efficient recovery of the aromatic acid product, heavy metal oxidation catalyst, and the wash water.

SUMMARY OF THE INVENTION

The present invention is an improved process for the purification of aromatic acids. The invention recovers the lost aromatic acid product and the heavy metal oxidation catalyst and recycles purified water. The process includes the steps of filtration to recover the insoluble aromatic acid, ion exchange to recover and purify the heavy metal oxidation catalyst, and a reverse osmosis system for recovering the water for reuse.

The wastewater contains significant amounts of insoluble aromatic acid. The aromatic acid can be recovered by means of conventional filtration devices such as back-washable tubular filters or horizontal plate filters. The preferred method is a continuous cross flow filter. Cross flow filters composed of inorganic materials are particularly effective for removing very fine particles under severe operating conditions of temperature and acidic or alkaline conditions.

The filter permeate contains low concentrations of heavy metals. The major heavy metals are cobalt and manganese, which comprise the oxidation catalyst. In addition to the oxidation catalyst, other heavy metals that are present include iron, chromium, and nickel. The metals are removed by passing the wastewater through a vessel containing a strong acid cation (SAC) resin.

After regeneration the SAC resin is rinsed with water and then returned to service. The regenerant containing the Co/Mn catalyst and other heavy metal impurities is further treated via an ion exchange process to purify and recover the catalyst for recycle to the aromatic acid manufacturing process.

The recovered Co/Mn catalyst is purified and recovered from the regenerant solution by a three-step process: (1) precipitation of the tramp metals by adjusting the pH followed by filtration to remove the precipitated metals, (2) removal of the Co/Mn catalyst from the brine solution by passing it through a vessel containing a special ion exchange resin (IER) which selectively removes the Co/Mn catalyst in the presence of sodium ions, (3) regeneration of the special IER to recover the Co/Mn catalyst.

A conventional reverse osmosis system provides excellent separation of the organic acids from the water. The permeate is suitable for recycle to the purification process. The retentate containing the organic salts is sent to a waste treatment plant.

It is therefore an object of the present invention to provide for the efficient recovery of aromatic acid product from wash water produced in the manufacture of aromatic acids.

It is a further object of the present invention to provide for the efficient recovery of metal catalyst.

It is also an object of the present invention to provide for the efficient recovery of wash water.

These and other objects and advantages of the present invention will be apparent from a consideration of the following detailed description of the preferred embodiments in conjunction with the appended drawings as described following.

DETAILED DESCRIPTION OF THE PREFERRED EMBODIMENTS

Figure 1:
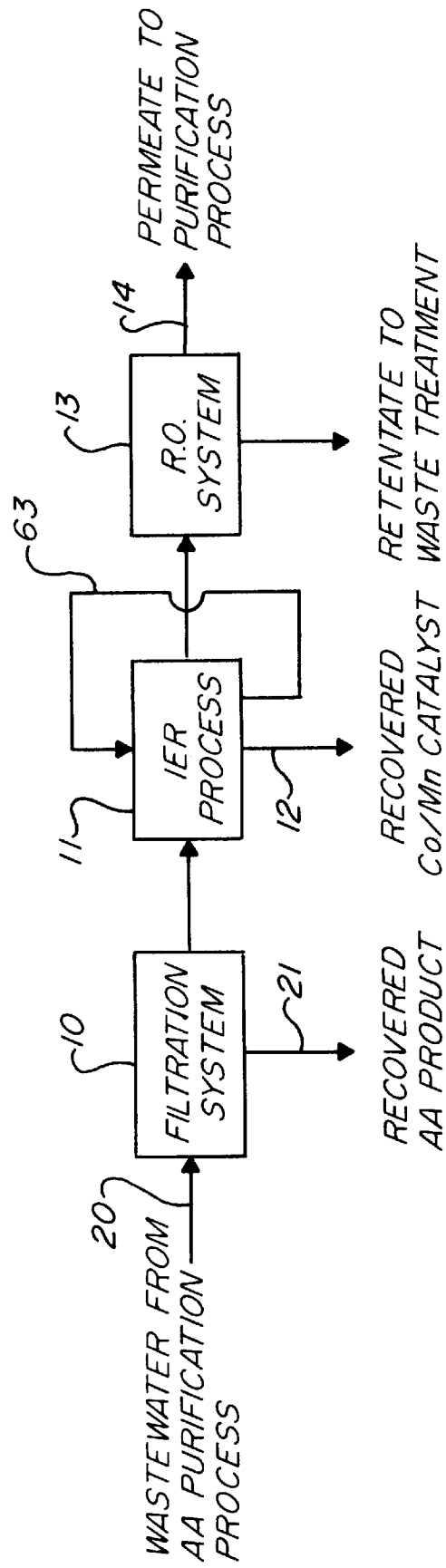
FIG. 1 is a generalized flow diagram of the improved process of the present invention depicting the process steps of (1) filtration to recover the insoluble aromatic acid, (2) ion exchange to recover and purify the heavy metal oxidation catalyst, and (3) reverse osmosis for recovering water for reuse.

With reference to FIG. 1, the preferred embodiment of the present invention may be described. The present invention is an improved apparatus and method for the purification of aromatic acid wash water generated in the aromatic acid purification process. The invention recovers the lost aromatic acid product and the heavy metal oxidation catalyst and recycles purified water. As depicted in FIG. 1, waste wash water 20 from the aromatic acid purification process (not shown) is first filtered in filtration system 10 to recover the insoluble aromatic acid 21, then ion exchange recovery process 11 is employed to recover and purify the heavy metal oxidation catalyst 12, and finally reverse osmosis system 13 recovers the purified water 14 for reuse.

Figure 2:
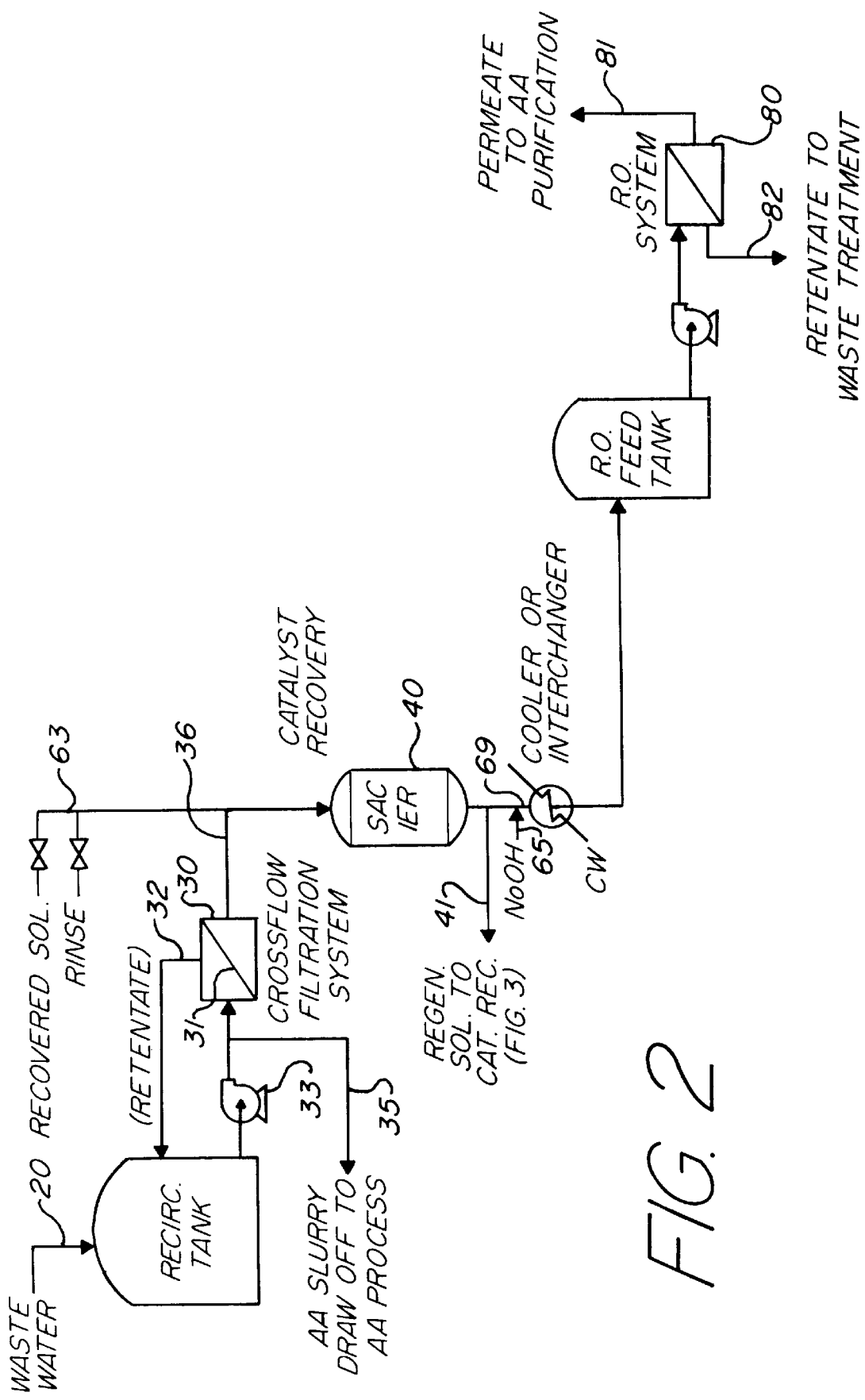
FIG. 2 is detailed flow diagram of the wastewater treatment process.
Figure 3:
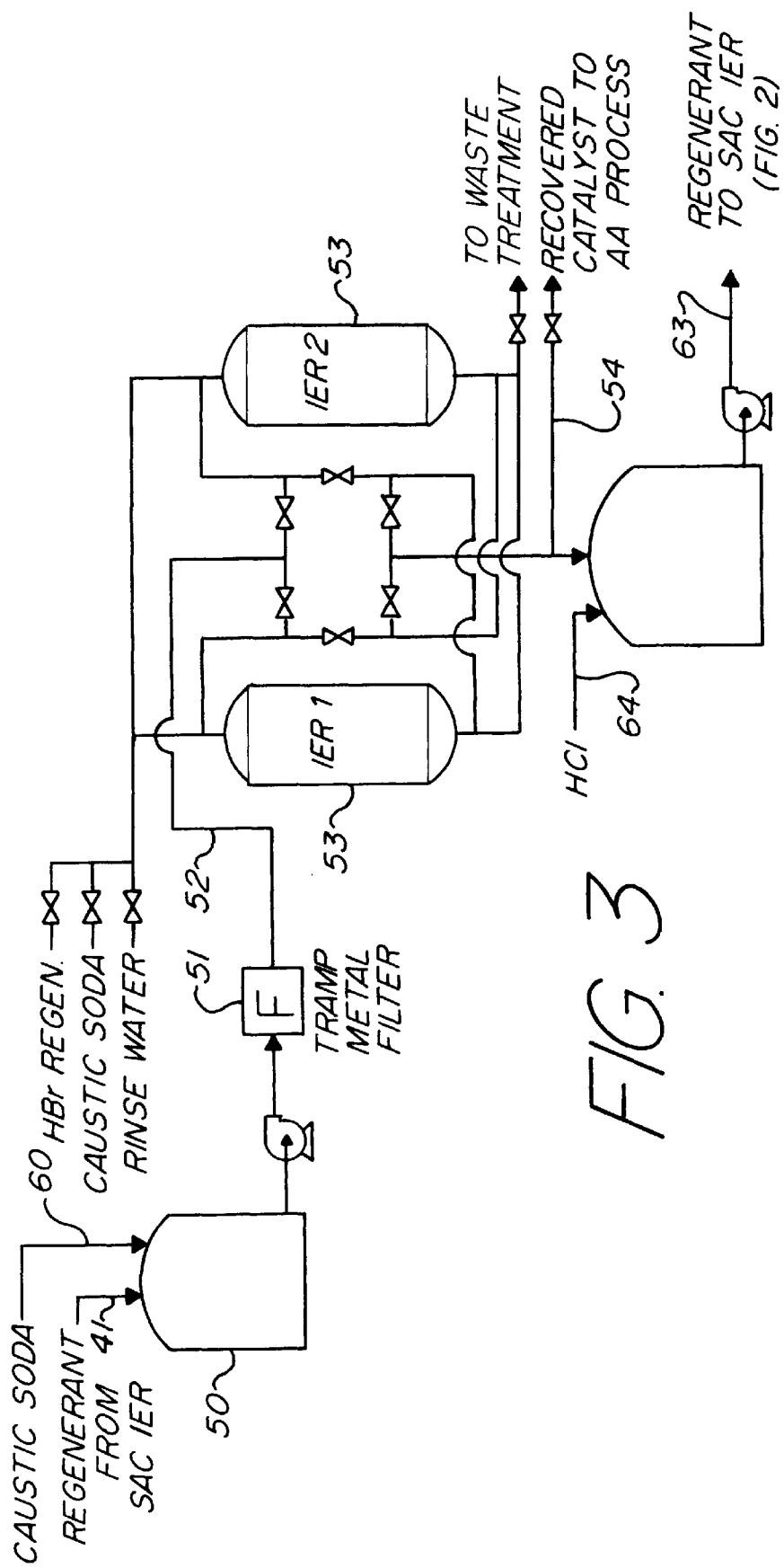
FIG. 3 is a detailed flow diagram of the catalyst recovery process for the purification of recovered Co/Mn catalyst in a three step process: (1) precipitation of the tramp metals by adjusting the pH followed by filtration to remove the precipitated metals, (2) removal of the Co/Mn catalyst from the brine solution by passing it through a vessel containing a special ion exchange resin (IER) which selectively removes the Co/Mn catalyst in the presence of sodium ions, (3) regeneration of the special IER to recover the Co/Mn catalyst.

The preferred embodiment of the process is shown in detail in FIGS. 2 and 3. The waste wash water 20 from the aromatic acid purification process contains significant amounts of insoluble aromatic acid 21. The insoluble aromatic acid 21 is recovered by means of filtration system 10, which may include conventional filtration devices such as back-washable tubular filters or horizontal plate filters. The preferred method as shown in FIG. 2 is a continuous cross flow filter 30. Cross flow filter 30 preferably employs a membrane 31 composed of inorganic materials, which is particularly effective for removing very fine particles under severe operating conditions of temperature and acidic or alkaline conditions. The inorganic membrane 31 can be composed of different ceramic materials such as, but not limited to, alumina, carbon, etc. Another type of inorganic material that is particularly effective is sintered powder metal alloys, including materials such as, but not limited to, stainless steel, titanium, etc. The cross flow filter 30 operates on the principle of maintaining the fluid flow at a sufficiently high velocity to keep the surface of the membrane 31 essentially free of particulates. A pump 33 circulates the wash water 21 across the membrane 31 and thence to a recirculation tank 34. The waste wash water 21 permeates through the membrane 31 with the solids remaining suspended in the rejected cross flow stream.32. The solids concentration can be increased to a concentration of a few milligrams per Liter up to 5–20%. The degree of concentration depends on several factors, such as particle size, fluid, viscosity, etc. A portion of the concentrated aromatic acid reject stream 35 is drawn off and sent to a thickener/settler (not shown) and then recycled to the aromatic acid manufacturing process. The particulate-free permeate 36 is then passed through the ion exchange process as will be described more fully below.

The filter permeate 36 contains low concentrations of heavy metals. The major heavy metals are cobalt and manganese, which comprise the oxidation catalyst. In addition to the oxidation catalyst, other heavy metals that are present include iron, chromium, and nickel. The metals are removed by passing the wastewater through a vessel 40 containing a strong acid cation (SAC) resin. Preferably, the SAC resin is a sulfonated crosslinked polystyrene polymer. The SAC resin is preferred since it is effective in removing cations in the presence of hydrogen ions. The permeate 36 contains a significant level of hydrogen ions due to the concentration of soluble organic acids. The SAC resin can be placed in the hydrogen or sodium form prior to introducing the permeate 36 through the SAC resin vessel 40. The preferred form is sodium due to economic reasons. An acidic sodium chloride (brine) solution is the preferred regenerant. The brine solution exchanges sodium for the heavy metals at a low pH of 1–3. The low pH is required to prevent the heavy metals from precipitating as a metal hydroxide and fouling the SAC resin. After regeneration the SAC resin is rinsed with water and then returned to service. An alternative process for the regeneration of the SAC resin is to convert the SAC resin from the sodium to the hydrogen form by passing acid through the SAC resin.

The regenerant 41 containing the Co/Mn catalyst and other heavy metal impurities is further treated via an ion exchange process to purify and recover the catalyst for recycle to the aromatic acid manufacturing process.

The Co/Mn catalyst is purified and recovered from the regenerant 41 by a three-step process as depicted in FIG. 3. First, the tramp metals are precipitated in vessel 50 by adjusting the pH of the regenerant 41 with caustic soda followed by filtration in tramp metal filter 51 to remove the precipitated tramp metals. The brine solution 52 passing through the tramp metal filter 51 contains the Co/Mn catalyst. Next, the Co/Mn catalyst is removed from the brine solution 52 by passing it through a vessel 53 containing a special ion exchange resin (IER) which selectively removes the Co/Mn catalyst in the presence of sodium ions. Finally, the special IER is regenerated to recover the Co/Mn catalyst 54.

The precipitation process is accomplished by adding a small amount of caustic soda (NaOH) 60 to the regenerant 41 to raise the pH to 4–5. The tramp metals precipitate as metal hydroxides and are removed by conventional filtration methods in tramp metal filter 51. The pH of the brine solution 52 from the tramp metal filter 51 is raised to 6–7 with NaOH 61 and then passed through the special IER vessel 53 to remove the Co/Mn catalyst. This special type of IER is commonly referred to as a chelating IER or a selective IER. Selective IER's that are suitable for this process contain functional groups such as, but not limited to, aminodiacetic, aminophosphonic, and polyacrylic acid. The Co/Mn is then removed from the selective IER by passing a solution of hydrobromic acid (HBr) 62 through the IER vessel 53. The resulting recovered catalyst solution 54 containing the catalyst and HBr is now of sufficient concentration and purity that it can be returned to the aromatic acid manufacturing process. The pH of the brine solution 63 that passes through the selective IER is lowered to about 1.5–3 with HCl 64 and reused for the regeneration of the SAC resin.

With reference to FIG. 2, the pH of the regenerant 41 from the SAC resin vessel 40 is typically in the range of 1.5–3. The pH is adjusted to 5–7 with NaOH 65.

The dissolved salts in the waste wash water are sodium salts of various organic acids such as benzoic, isophthalic, terephthalic, and paratoluic. Since the temperature of the waste wash water 69 after passing through the SAC resin vessel 40 is about 75–95° C., a heat exchanger 70 is required to cool the wash water 69 to a temperature of about 25–45° C. for the reverse osmosis (RO) system 80. A conventional reverse osmosis system provides excellent separation of the organic acids from the wash water. The permeate 81 from the reverse osmosis system 80 is suitable for recycle to the purification process. The retentate 82 containing the organic salts is sent to waste treatment (not shown). Typical recovery rates for waste wash water containing low levels of organic acid salts is around 85%.

The present invention has been described with reference to certain preferred and alternative embodiments that are intended to be exemplary only and not limiting to the full scope of the present invention as set forth in the appended claims.

What is claimed is:

1. A method for the purification and recycle of waste wash water from the purification of aromatic acids wherein the waste wash water comprises insoluble aromatic acid, heavy metal oxidation catalyst, other heavy metal impurities and organic salts, comprising the steps of:
    (a) passing the waste wash water through a filter to recover the insoluble aromatic acid;
    (b) passing the waste wash water through an ion exchange resin to remove the heavy metal oxidation catalyst and other heavy metal impurities;
    (c) passing the waste wash water through a reverse osmosis system to remove the organic salts; and
    (d) returning the waste wash water to the aromatic acid purification process.

2. The method of claim 1 wherein the continuous cross flow filter is a ceramic filter.

3. The method of claim 1 wherein the continuous cross flow filter is a sintered powder metal alloy filter.

4. The method of claim 1 wherein the ion exchange resin of step (b) is a strong acid cation resin in the sodium form.

5. The method of claim 4 further comprising the step of regenerating the strong acid cation resin to produce a regenerant comprising heavy metal oxidation catalyst and other heavy metal impurities.

6. The method of claim 5 further comprising the steps of recovering the heavy metal oxidation catalyst by adjusting the pH of the regenerant to precipitate the heavy metal impurities, removing the precipitated heavy metal impurities by filtration, passing the regenerant through a special ion exchange resin to selectively remove the heavy metal oxidation catalyst, and regenerating the special ion exchange resin to recover the heavy metal oxidation catalyst.

7. The method of claim 6 wherein the heavy metal oxidation catalyst comprises cobalt and manganese.

8. The method of claim 7 wherein the regenerant is sodium chloride.

* * * * *

UNITED STATES PATENT AND TRADEMARK OFFICE
CERTIFICATE OF CORRECTION

Page 1 of 1

PATENT NO. : 5,980,750
DATED : November 9, 1999
INVENTOR(S) : Michael D. Kelly

It is certified that error appears in the above-identified patent and that said Letters Patent is hereby corrected as shown below:

Column 5, claim 1,
Line 16, after "passing the wash water through a" insert -- continuous cross flow --.

Column 6, claim 6,
Line 15, delete "special" and substitute therefore -- chelating --.
Line 17, delete "special" and substitute therefore -- chelating --.

Signed and Sealed this

First Day of January, 2002

Attest:

Attesting Officer

JAMES E. ROGAN
*Director of the United States Patent and Trademark Office*